Nov. 26, 1963  W. V. BAKER  3,111,784
FISHING WEIGHT
Filed Aug. 22, 1961
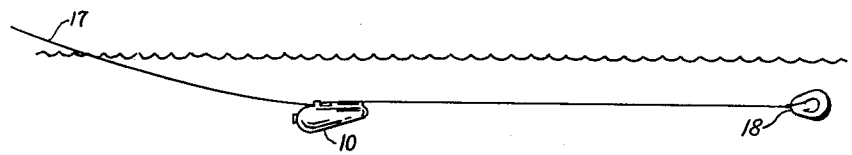
*Fig 1*
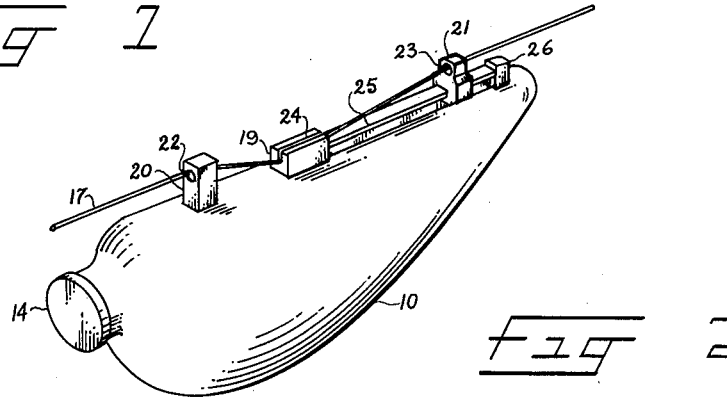
*Fig 2*
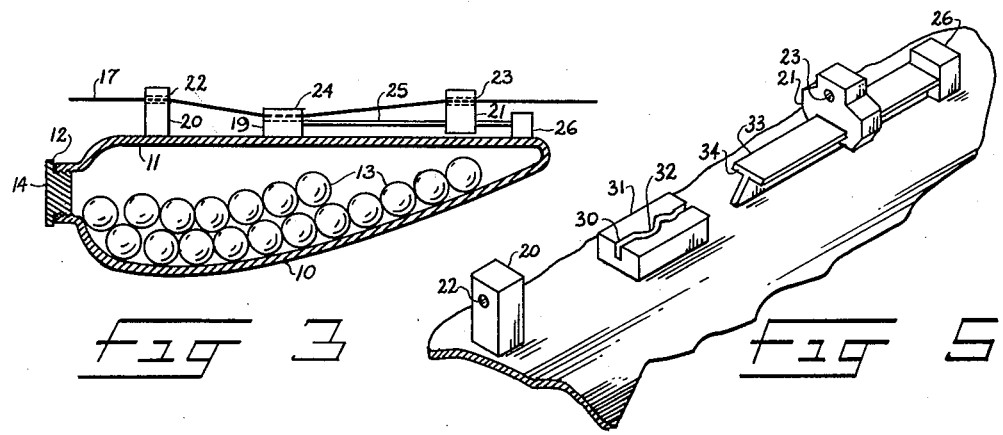
*Fig 3*  *Fig 5*
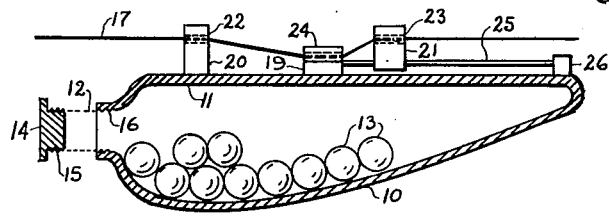
*Fig 4*
INVENTOR.
WILLIAM V. BAKER
BY Roy Mattern Jr.
ATTORNEY

United States Patent Office

3,111,784
Patented Nov. 26, 1963

3,111,784
FISHING WEIGHT
William V. Baker, 15510 SE. 25th St., Bellevue, Wash.
Filed Aug. 22, 1961, Ser. No. 134,051
6 Claims. (Cl. 43—43.14)

This invention relates to fishing tackle and more particularly to a fishing weight and universal usage line attachment means.

The purpose of the invention is to provide a weight which can be altered with respect to its total weight and also its line holding power at any time, even when fastened to the fishing line.

An object of this invention is to provide a weight having an interior compartment which can be variably loaded with multiple increment weight units.

An object of the invention is to provide a weight having a quick opening and closing watertight cover for its interior compartment.

An object of this invention is to provide a weight having a good shape for under water motion.

An object of this invention is to provide a weight having a line attachment means providing at all times slidable two point support and when needed an additional non sliding support of variable holding power.

An object of this invention is to provide a line attachment means for any device attached to a fishing line providing at all times a slidable engagement means and in addition when required a variable gripping engagement means.

The purpose and objects of this invention will be understood better as the following description is read with references being made to the drawings, in which:

FIGURE 1 indicates the general line arrangement in the water showing the relative position of the weight with a lure and flasher.

FIGURE 2 is a perspective view of one embodiment of the weight attached to a fishing line.

FIGURE 3 is a sectional view of the weight shown in FIGURE 2 with the line attachment means set for release at a higher fishing line load and the interior of the weight filled to one half capacity with increment weight units.

FIGURE 4 is a sectional view similar to FIGURE 3 with the line attachment means set for release at a lower fishing line load and the interior of the weight filled to one third capacity with increment unit weights, and FIGURE 5 is a perspective view, enlarged, of a modified line fastening means.

The fishing weight 10 illustrated in these FIGURES 1 through 5, provides the fisherman with a means of controlling the depth of his fishing lure with higher accuracy over a greater range of depth requirements than any other weight means. The weight is actually a weight or sinker shell 11 with an access opening 12 to its interior, permitting the ready addition or removal of increment weight units 13 by the fisherman. The access opening 12 is secured and made watertight by any sure fitting means that is compatible with the body structure. Plastic parts have been found to be particularly suitable. When they are used the watertight cap 14 can be a snap in type with interlocking watertight projections 15 and grooves 16 being employed as indicated in FIGURES 3 and 4.

Load changing is accomplished by the fisherman without removing the fishing weight from the line 17. At all times the access opening is clear of the line attachment means or any other possible obstruction.

In addition the fishing weight 10 illustrated in these FIGURES 1 through 5 provides the fisherman with a means of controlling the pull required to free the weight for sliding along the fishing line. As the fish (not shown) strikes the lure 18 or an object (not shown) snags the line 17, at some present line load the weight 10 is automatically set free of its own line positioning-holding power means 19, while still retaining its own line sliding-holding means 20, 21.

In FIGURES 2, 3, and 4 this dual functioning universal adjustable line fastening means is shown in one embodiment which employs two body projections 20, 21 to slidably receive the fish line 17 threaded through their openings 22, 23, and in addition utilizes a third body projection 19 having a line gripping slot 24 to securely hold the weight stationary on the fishing line 17. The third body projection 19 is positioned between the body projections 20, 21 just referred to that slidably receive the line 17.

The way this universal line fastening means is adjusted to control the pull required to dislodge the weight 10 from its immediate position along the line 17 when the fish strikes is indicated by noting in FIGURES 3 and 4 the relative positions of the three body projections 19, 20, 21. In FIGURE 3, their arrangement results in requiring a greater pull to dislodge the fishing line from the slot 24 of the lower middle body projection 19 which grips the line 17. The other body projections, which are variably spaced by having at least one projection slidably mounted on a T-shaped body-track 25 which extends from the middle line gripping body projections 19 to the body supported rear abutment 26, slidably hold the line 17 at widely spaced locations.

In contrast, in FIGURE 4, the arrangement results in a smaller pull needed to dislodge the fishing line from the lower middle gripping body projection 19. It will be noted in comparing the relative positions of the projections in FIGURES 3 and 4, that in FIGURE 3 when the higher projections 20 and 21 encompassing the line are spaced farther apart from one another, the fishing line 17 need not be deflected very much to be secured to the lower middle gripping body projection 19. Consequently, any subsequent line pull does not have much of a tendency to dislodge the line from the gripping groove or slot 24. The tendency to dislodge the line 17 from the gripping slot 24, however, increases as the higher projections 20, 21 are spaced closer together.

Where only one of the higher projections 21 is movable, as illustrated in the FIGURES 1 through 5, the tendency to dislodge the fishing line 17 is essentially varied in accordance with the space between the lower linegripping body projection 19 and the movable higher line encompassing projection 21.

A second embodiment of this universal line pull regulating means is illustrated in FIGURE 5. The groove 30 in the lower line gripping body projection 31 has at least one turn 32 which increases the friction and substantially prevents any in-line slippage of the fishing line 17 relative to the locking groove 30 or slot 30. In addition the body-track 33 is not blocked, at least at one end 34, which permits the removal of the slidably mounted higher line encompassing projection 21. Such removal may be desired for replacement purposes where a new unit or a different size line encompassing projection is wanted. There may be times when the weight is snagged so badly that this removal possibility may help to dislodge the snagged weight and free the line.

A fishing weight as illustrated in these FIGURES 1 through 5, can be adjusted at any time to comply with many relative requirements of interrelated loadings of both line pull and line weight. The fisherman quite often during one outing changes his fishing tactics making this weight a very desirable one for him to have.

For example, early in the morning he may try to catch fish that are feeding near the surface and little weight is required to lower the lure into the water. As the day progresses, he may try to catch fish at greater depths and more weight is required. These weight changes are made very conveniently and accurately by adding or removing increment weights that are contained within weight or sinker shell. The change in fishing depth or fishing grounds may also require, in addition to weight changes, that at the same time an adjustment of the line tension be undertaken for the size of the fish sought are anticipated to be bigger or smaller. If the fisherman has this weight which he can adjust dually for these interrelated purposes brought about by the need for frequent changes in his fishing tactics, his effectiveness is increased manyfold for the changes are made easily and quickly while the weight is attached to the fishing line. The weight changes, with respect to any increase or decrease only require the insertion or removal of increment weights into or out of the interior of the shell through the capped opening. The fishing line anticipated "freeing" tensile loadings or line pulls are easily matched to the weight changes, so the fisherman has at all times the opportunity of quickly adjusting his fishing tackle to comply with his tactical planning for and during his fishing outing. In addition, by completely removing the increment weights, the fisherman provides himself with a bobber of some usefulness when needed.

I claim:

1. A weight for regulated attachment to a fishing line throughout a wide range of total weight requirements comprising a body having a capped accessible interior space, multiple removable weights contained within the interior space of the body, and a line attachment structure on the body having two spaced projections movable with respect to one another equipped with line encompassing portions, a track like structure to support at least one spaced projection and there being a restrictive entrance recess on at least one spaced projection to encompass a portion of the track like structure for variably positioning the recessed spaced projection along the track, a third projection located between the two spaced projections of lesser height than the line encompassing portions and equipped with a releasable line gripping portion.

2. A weight for attachment to a fishing line under varying weight and line pull requirements, comprising a low drag shaped body having a recessed interior, a removable cap on the body for gaining access to the interior of the body, and line attachment projections aligned along the top of the body, two of such projections being equal in height and variably spaced from one another, at least one of the equal height projections being mounted on the body on a track like body structure with its projected structure in part transversely confined but not axially confined by interfitting with the body track structure, and both equal height projections having aligned completely confining passages to slidably encompass the fishing line and another of such projections being of lesser height than the line confining passages to releasably grip the line within a top loading slot therein at a point between the said higher variably spaced projections.

3. A weight for attachment to a fishing line which can be adjusted both as to its total weight and line gripping power while confined to the fishing line, comprising a hollow body having a removable cap means for access to its interior, regulated weight means confined within the interior of the body, and a line attachment means on the body having two spaced aligned line encompassing recessed portions to slidably confine the body to the line, a third line engaging portion between said two aligned portions having a partial line encompassing close fitting recess to releasably grip the line in a deflected position and an adjustable means on the body to receive at least one of the two aligned line encompassing portions of the body to change the space between these aligned line attachment portions thereby controlling the gripping capability of the line attachment means.

4. A weight for attachment to a fishing line which can be adjusted with respect to its line holding power while secured to the fishing line comprising a weight body and a line attachment means on the body having two spaced aligned line encompassing portions to slidably secure the body to the line, an intermediate, non aligned third line engaging slotted portion to releasably grip the line in a deflected position and an adjustable means on the body to change the spacing between the aligned line attachment portions thereby controlling the deflection and consequently the gripping capability of the line attachment means.

5. The improvement in continuous line attachment means comprising a common structure, three portions projecting out from the common structure, two of such portions being recessed and substantially positioned apart and aligned to encompass the line for sliding engagement therewith without deflecting the line, a third of such portions being slotted and not aligned to releasably grip and deflect the line between the other aligned line encompassing projections, and a means on the common structure to vary the relative distances between the projections so that the line can be variably deflected regulating the gripping force thereby predetermining under what "end of the line" loading force the line attachment means will convert from a gripping engagement means to a sliding engagement means.

6. The improvement in the line attachment means of a bobber for attachment to a fishing line comprising three line engaging structures on the bobber, two of such structures being elevated, recessed and spaced apart to encompass the fishing line for sliding engagement therewith without deflecting the line, the third such structure located between the other two structures and being slotted and lower in elevation releasably gripping and deflecting the fishing line between the other spaced higher recessed line encompassing structures, and a means to vary the relative distances between the projections so that the deflection and thereby the gripping force can be regulated determining under what "fish on the line" loading force the line attachment means will convert from a gripping means to a sliding engagement means.

References Cited in the file of this patent

UNITED STATES PATENTS

| | | |
|---|---|---|
| 2,181,458 | La Gue | Nov. 28, 1939 |
| 2,425,069 | Metzler | Aug. 5, 1947 |
| 2,659,176 | Wenger | Nov. 17, 1953 |